United States Patent
Lisse et al.

(10) Patent No.: US 10,810,328 B2
(45) Date of Patent: Oct. 20, 2020

(54) METHOD FOR DEVELOPING AN ASSEMBLY WHICH HAS AT LEAST ONE MECHATRONIC COMPONENT, AND A CORRESPONDING ARRANGEMENT

(71) Applicants: EPLAN SOFTWARE & SERVICE GMBH & CO. KG, Monheim am Rhein (DE); CIDEON SOFTWARE & SERVICES GMBH & CO. KG, Gräfelfing (DE)

(72) Inventors: Rolf Lisse, Leverkusen (DE); Gerhard Wulff, Haan (DE); Arnd Paulfeuerborn, Essen (DE)

(73) Assignees: EPLAN SOFTWARE & SERVICE GMBH & CO. KG, Monheim am Rhein (DE); CIDEON SOFTWARE & SERVICES GMBH & CO. KG, Gräfelfing (DE)

( * ) Notice: Subject to any disclaimer, the term of this patent is extended or adjusted under 35 U.S.C. 154(b) by 329 days.

(21) Appl. No.: 15/767,410

(22) PCT Filed: Sep. 19, 2016

(86) PCT No.: PCT/DE2016/100435
§ 371 (c)(1),
(2) Date: Apr. 11, 2018

(87) PCT Pub. No.: WO2017/080543
PCT Pub. Date: May 18, 2017

(65) Prior Publication Data
US 2018/0300430 A1      Oct. 18, 2018

(30) Foreign Application Priority Data
Nov. 11, 2015   (DE) .................. 10 2015 119 414

(51) Int. Cl.
G06F 17/50      (2006.01)
G06F 30/00      (2020.01)
G06F 111/02     (2020.01)

(52) U.S. Cl.
CPC .......... *G06F 30/00* (2020.01); *G06F 2111/02* (2020.01)

(58) Field of Classification Search
CPC ....... G06F 30/00; G06F 2111/02; G06F 17/50
(Continued)

(56) References Cited

U.S. PATENT DOCUMENTS

| 6,721,614 B2 * | 4/2004 | Duncan | G06F 30/00 700/97 |
| 7,266,476 B2 * | 9/2007 | Coburn | G05B 17/02 700/83 |

(Continued)

FOREIGN PATENT DOCUMENTS

| DE | 102010043405 A1 | 3/2012 |
| JP | H9-138823 A | 5/1997 |
| JP | 2011-107962 A | 6/2011 |

OTHER PUBLICATIONS

International Search Report (in English and German) and Written Opinion (in German) issued in PCT/DE2016/100435, dated Jan. 3, 2017; ISA/EP.

(Continued)

*Primary Examiner* — Andrew Joseph Rudy
(74) *Attorney, Agent, or Firm* — Harness, Dickey & Pierce, P.L.C.

(57) ABSTRACT

The invention relates to a method for developing an assembly, which at least includes one mechatronics component with a mechanical portion, an electrical portion, and an information technology portion, wherein the method includes the steps of: Developing the mechanical portions, the electrical continuous or periodic communicating of a (Continued)

Figure 1:
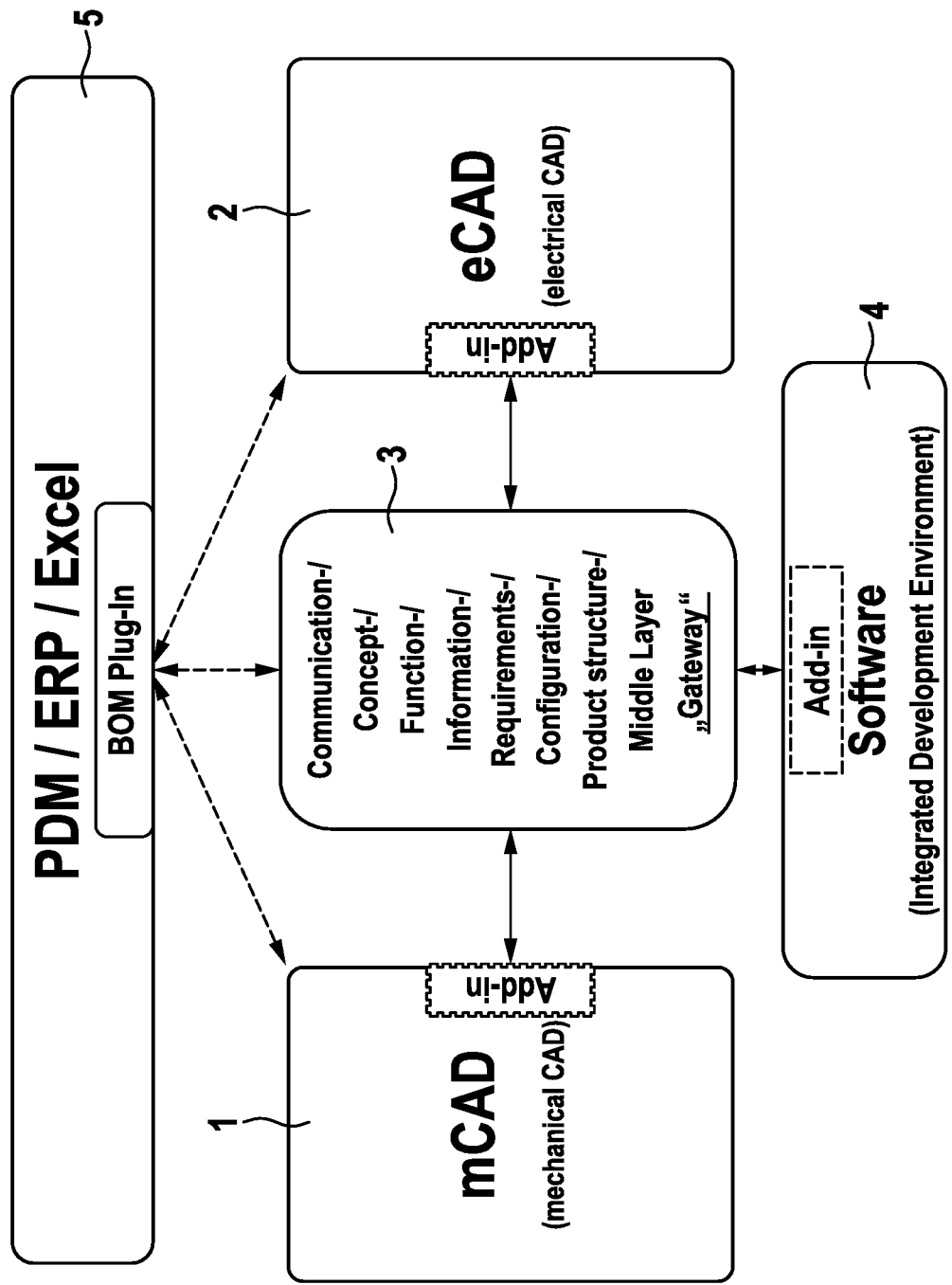

development status information of the development process of at least a first of the portions to the development process of a second of the portions or to the development processes of the two remaining portions; and varying the development processes of the second of the portions or the development processes of both remaining portions, taking into account the development status information. The invention further relates to a respective arrangement.

10 Claims, 2 Drawing Sheets

(58) Field of Classification Search
USPC ......... 700/83, 97; 705/7.11, 7.36, 7.41, 300; 717/104
See application file for complete search history.

(56) References Cited

U.S. PATENT DOCUMENTS

| | | | |
|---|---|---|---|
| 7,467,671 B2* | 12/2008 | Savignat | E21B 10/32 175/57 |
| 7,503,032 B2* | 3/2009 | Bhaskaran | G06Q 10/06 717/104 |
| 7,536,607 B2* | 5/2009 | Jalobeanu | G06F 9/4843 714/47.1 |
| 7,703,071 B2* | 4/2010 | Kuester | G06F 8/10 717/104 |
| 8,145,518 B2* | 3/2012 | Cao | G06Q 10/06 705/7.41 |
| 8,175,911 B2* | 5/2012 | Cao | G06Q 10/063 705/7.36 |
| 8,738,410 B2* | 5/2014 | Cogswell | G06Q 10/063 705/7.11 |
| 9,250,897 B2* | 2/2016 | Jarrett | G05B 19/056 |
| 9,720,393 B2* | 8/2017 | Cote | G05B 19/41885 |
| 9,904,268 B2* | 2/2018 | Blevins | G05B 19/0428 |
| 2005/0183081 A1* | 8/2005 | Burdy | G06F 8/60 717/174 |
| 2009/0192857 A1 | 7/2009 | Morse et al. | |

OTHER PUBLICATIONS

Japanese Office Action (w/English translation) dated Jun. 4, 2019 in corresponding Japanese Application No. 2018-525405.

* cited by examiner

METHOD FOR DEVELOPING AN ASSEMBLY WHICH HAS AT LEAST ONE MECHATRONIC COMPONENT, AND A CORRESPONDING ARRANGEMENT

CROSS-REFERENCE TO RELATED APPLICATIONS

This application is a 371 U.S. National Stage of International Application No. PCT/DE2016/100435, filed on Sep. 19, 2016, which claims priority to German Application 10 2015 119 414.7, filed on Nov. 11, 2015. The entire disclosures of the above applications are incorporated herein by reference.

FIELD

The invention is based on a method for developing an assembly which at least includes one mechatronic component with a mechanical portion, an electrical portion, and an information technology portion.

BACKGROUND

This section provides background information related to the present disclosure which is not necessarily prior art.

DE 10 2010 043 405 A1 describes a planning procedure for a mechatronic system which includes multiple mechatronic units, wherein a mechatronic unit data structure is stored for each mechatronic unit, wherein said mechatronic data structure includes information about the respective mechatronic unit. A process flow data structure is provided, which includes information about the process flow of the mechatronic system. This flow has the following steps: a) Selecting at least two mechatronic unit data structures based on the process flow data structure; b) Automatically creating a hierarchy of the selected mechatronic unit data structure based on the process flow data structure, wherein the mechatronic unit data structure is divided into parent and child data structures; c) Providing interfaces in the selected parent mechatronic unit data structures based on the interfaces disposed in the child mechatronic unit data structures; and d) Specifying an assignment of each of the interfaces of the parent mechatronic unit data structures provided to the interfaces of the respective child mechatronic unit data structures, wherein said assignment is stored in the parent and/or the respective child mechatronic unit data structure(s).

The methods known from prior art have the disadvantage that the mechanical portion, the electrical portion, and the information technology portion are developed completely independently in parallel development processes, which has the particular disadvantage that requirements for the development of a first portion resulting from the development of a second portion can only be taken into account to a limited extent and with a great time delay.

SUMMARY

This section provides a general summary of the disclosure, and is not a comprehensive disclosure of its full scope or all of its features.

It is therefore the object of the invention to propose a method for developing an assembly including a mechatronic component, which minimizes the interdisciplinary development effort and particularly minimizes development times in each development discipline.

The method according to the invention includes the following steps:

developing the mechanical portions, the electrical portion, and the information technology portion in separate development processes;

continuous or periodic communicating of a development status information of the development process of at least a first of the portions to the development process of a second of the portions or to the development processes of the two remaining portions; and varying the development processes of the second of the portions or the development processes of both remaining portions, taking into account the development status information.

Continuous or periodic communication of at least one piece of development status information of the development processes of the portions can be ensured that the development processes of the portions, which in principle are independent of one another, can be coordinated better and particularly that changes made in one of the portions can substantially be communicated to the development processes of the other portions without a time delay, such that there can be a development response, if required, to these changes if the change of the first portion communicated has an influence on the development of a second portion.

Complex mechatronic components can be divided into functional subgroups, all of which are developed in a separate development cycle, respectively. A needs analysis can be used to determine the portions which include the subcomponent to be developed and how many development processes (mechanical, electronic, or information technology related) must therefore be involved.

The data structure can be a structure which is adapted to the mechatronic product to be developed or to a specific engineering process of a user, regardless of the authoring systems and individually. The structure can be requirement oriented or function oriented, wherein it can be component oriented or process oriented, particularly for series production.

The method may further include the steps of:

creating a requirement profile from a multitude of individual requirements to be met by the mechatronic component to be developed;

qualifying each individual requirement based on whether it has an influence on the development of the mechanical portion, the electrical portion, the information technology portion, or multiple of these portions; and storing the requirement profile and a result of the qualification in a database and providing the requirement profile and qualification result for respective authoring systems for the development of the portions via the database.

Furthermore, a development status of the mechanical portion, the electrical portion, and/or the information technology portion and an evaluation if the respective development status meets at least one of the individual requirements can be stored in the database.

The separate development processes can be performed using independent authoring systems, wherein the authoring systems exchange the development information via an interface and/or a gateway among each other.

The authoring systems can, for example, be common CAD systems. The authoring systems can further be exclusively implemented in software. The authoring systems can in this respect be coupled via plug-ins for data exchange via the interface and/or the gateway.

A warning message can be communicated between the authoring systems via the interface and/or the gateway and, if required, be stored in a memory which the authoring systems can access if the development status of one of the portions was changed via the assigned authoring system and an evaluation has found that this change requires a change of the development status of another portion to meet at least one individual requirements to be met by the mechatronic component to be developed. In this way, changes of the development status of one of the portions can be immediately forwarded to the development processes, for example, the authoring systems, to be taken into respective account there. In addition, an evaluation can be made whether the respective change has an influence on the development of another portion to make the development status information more exploitable for the respective authoring system addressed.

Furthermore, the development processes of the respective other portions can be influenced by the change of the development status of a first portion in that the development process of the respective portion is held back until a specific development status of the portion issuing the development status information is achieved. Furthermore, the development process(es) can be started or resumed if a specific development status of the portion that is the subject matter of the development status information has been achieved.

The method can further include communicating a requirement profile or a development instruction to the development process of a second of the portions or the development processes of the two remaining portions as a function of a final or preliminary development outcome of the first portion.

Finally, the method can include buffering development status information in a buffer which development processes can access, wherein a relevance check is performed to determine whether a respective buffered piece of development status information requires a variation of the development processes of one of the portions or not, and wherein only such development status information is buffered whose relevance check has found that it requires a variation of the development process.

According to another aspect, the invention describes an arrangement for developing an assembly, which includes at least one mechatronic component, according to the method described above. The arrangement has the following features:

a first computer system on which a first authoring system for developing a first of the portions is installed, a second computer system on which a second authoring system for developing a second of the portions is installed, and a third computer system on which a third authoring system for developing a third of the portions is installed, a data interface and/or a gateway via which the computer systems are interconnected and exchange development status information about portions, wherein each of the authoring systems is configured to output communicated development status information of the respective other authoring systems via the data interface and/or the gateway.

The authoring systems can be identical authoring systems, or they can be designed as discipline-specific systems for developing precisely one of the portions. At least one of the authoring systems can also be of interdisciplinary design or at least be designed for developing two portions. Also, at least two authoring systems can be provided for one of the portions.

The computer systems can for example be local PCs on which a respective development system configured for the development process is installed as authoring system, for example a CAD-based system. The computer systems can communicate with one another and, for example, exchange the development status information via the data interface and/or the gateway. This makes it possible, for example that the respective development status of the electronic portion is taken into account when developing the mechanical portion. Furthermore, changes of the development status of one of the portions can be output to the respective authoring system and there, for example, visible be displayed for a user.

Furthermore, the authoring systems can be connected via the data interface and/or the gateway for accessing a PDM and/or ERP system.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
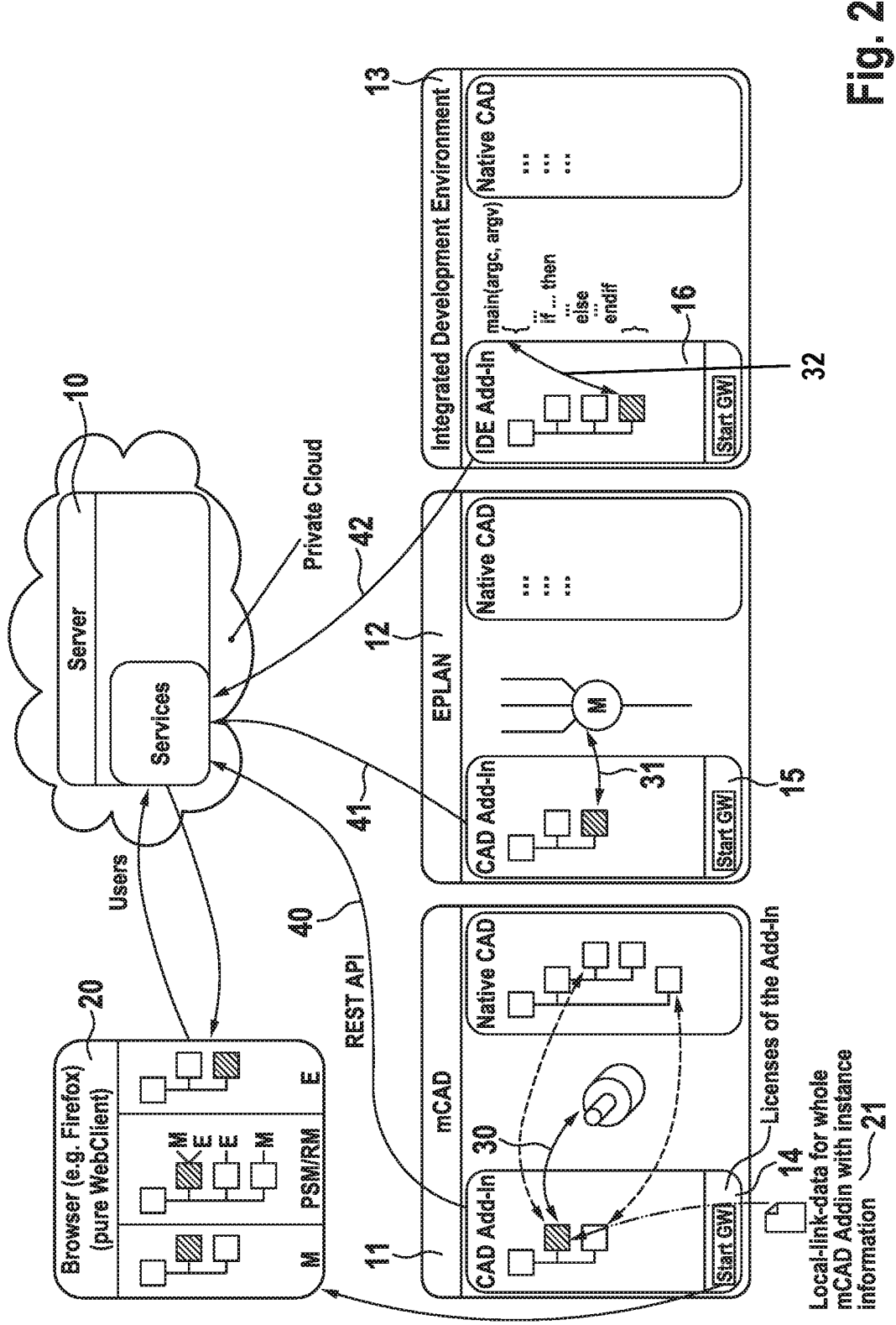

Further details of the invention are explained with reference to the figures below. Wherein:

FIG. 1 is a schematic view of an exemplary method for developing an assembly; and FIG. 2 is a schematic view of another embodiment of the method according to the invention.

DETAILED DESCRIPTION

Example embodiments will now be described more fully with reference to the accompanying drawings.

In the method shown in FIG. 1, independent authoring systems 1, 2, 4 are used to develop the mechanical portion, the electronic portion, and the information technology portion of the mechatronics component of an assembly. During the development of the portions, a respective piece of development status information of the respective development process is continuously communicated via a gateway 3 via which the authoring systems 1, 2, 4 are communicatively interconnected. Based on the exchanged development status information, the authoring systems 1, 2, 4 can influence their respective development processes. The result achieved in this manner is that the portions developed by the different authoring systems 1, 2, 4 are mutually compatible. Furthermore, parallel development of the various portions reduces the development time.

The authoring system 1 is designed as a mCAD system for developing the mechanical portion, while the other authoring system 2 is designed as an eCAD system for developing the electronic portion. The other authoring system 4 is used for developing the information technology portion of the mechatronics component.

The gateway 3 is further connected with a product data management system (PDM system) and/or enterprise resource planning system (ERP system) for exchanging and storing respective data. Each authoring system can be directly connected to the PDM and/or ERP system 5, or indirectly connected to the same via the gateway 3.

The gateway 3 facilitates improved communication and improved documented processes in development projects within individual engineering disciplines, but also particularly in projects in which multiple engineering disciplines are involved, such as the case illustrated here.

Communication and processes are represented by a discipline-neutral data structure. This connection can be integrated into all common authoring systems using known interfaces.

FIG. 2 shows another embodiment using any desired MCAD system 11, an ECAD system 12, and any desired software environment (13) as authoring systems. Communication between the authoring systems 11, 12, 13 is configured via web services in a cloud-based data memory.

The data structure and development status information stored in the data memory can also be accessed outside the authoring systems 11, 12, 13, which can be initiated both from the authoring systems 11, 12, 13 or directly from the browser. The decentralized data memory makes the arrangement location-independent; it can consequently be established across any desired locations.

The structure shows how embodiments, features, and/or attributes from each of the authoring systems 11, 12, 13 can be linked, mutually communicated, and made available via a data memory.

What is shown therefore is a cloud-based gateway solution in a private cloud. A plug-in 14 in the MCAD system 11 is used to link CAD objects, such as parts and/or assemblies, to the common mechatronics product structure.

These links and the status information are communicated to the data memory via the "REST API" 40. Parameters and features from mechanical embodiment details can be communicated as well. The "REST API" 40, 41, 42 is also used to cyclically receive relevant status information of the other disciplines from the gateway (almost in real time).

Almost the same takes place in the "EPLAN" ECAD system 12. This is where installed electrical components and/or entire circuits are linked to the mechatronics structure. The same takes place in the software environment 13. This is where programs and functions are linked.

The structure, the status information and features can also be viewed and modified outside the authoring systems 11, 12, 13 and the plug-ins. This is done here using a web browser 20. The web browser 20 is also used to model the mechatronics structure which is then available for linking in the authoring systems 11, 12, 13 via the plug-ins.

The browser application can both be started directly in the browser or via the plug-ins and includes all features of modern web UIs, currently based on HTML5 standards. The server application can administer and store one or several mechatronics projects with their structures, features, and the mechatronics status information. It can also happen that the plug-ins buffer status information in the authoring systems and then use it for fast status reconciliation (21).

By creating the link 30, 31, 32 and communicating this status information, the plug-ins 14, 15, 16 can be represented in the authoring systems 11, 12, 13, and the status information of all disciplines can be represented in the web application 20. This can be done, for example, visually, such as in the form of traffic lights, linking icons, text, or the like.

A structure can be created in the browser extension and represented within the extension of the respective discipline. An element can also be assigned to the respective technical discipline within the extension. This can for example be a 3D component in the mechanics CAD, a circuit diagram page or a circuit diagram element from the electrical CAD, or a function block from software development. After successful linking, the communication functionality of the extension can be communicated with other disciplines.

This communication can be reproduced within the browser application. In addition, all changes are documented in a so-called "activity stream". The status of each discipline can be changed by the respective extension. The status can also be viewed from the respective other disciplines. This means that, for example, a mechanics developer can see if a requirement has already been implemented by electrical engineering.

Another great benefit is achieved using the system-independent viewing function. Developers can view assigned elements (e.g. circuit diagram, a 3D component, or a software block) from any point of the application without needing to have the respective system-specific software installed. In this way, software developers can view the image of the 3D assembly to get a better idea of what it looks like. Or a mechanic can take a quick look on the circuit diagram of a component, e.g. a light beam device, which he is about to install or has installed.

The principles underlying this invention are not just suitable for developing mechatronics assemblies; they are also generally suitable for communication, cooperation, and requirements management within a discipline, e.g. mechanical development. Several designers are given the chance to communicate along an assembly, such that multiple designers can influence the development process in real time via the respective authoring systems.

The features of the invention disclosed in the above description, the drawings and the claims can be relevant both individually and in combination for implementing the invention.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method for developing an assembly, which at least includes one mechatronics component with a mechanical portion, an electrical portion, and an information technology portion, wherein the method includes the steps of:
   developing the mechanical portion, the electrical portion, and the information technology portion in separate development processes, wherein developing the mechanical portion takes place using a first computer system on which a first authoring system for developing the mechanical portion is installed, wherein developing the electrical portion takes place using a second computer system on which a second authoring system for developing the electrical portion is installed, and wherein developing the information technology portion takes place using a third computer system on which a third authoring system for developing the information technology portion is installed;
   continuously or periodically communicating development status information amongst at least two of the mechanical portion, the electrical portion, and the information technology portion via a data interface and/or gateway connecting the mechanical portion, the electrical portion, and the information technology portion; and
   wherein each of the first authoring system, the second authoring system, and the third authoring system outputs communicated development status information of the respective other authoring systems via the data interface and/or the gateway, and the development process of at least one of the mechanical portion, the electrical portion, and the information technology portion is/are varied based on the communicated development status information;

wherein the varying of the development process of at least one of the mechanical portion, the electrical portion, and the information technology portion includes pausing the development process until a specific development status of the communicated development status information is achieved, and resuming the development process after the specific development status is achieved;

creating a first link using a first plug-in linking CAD objects of parts and/or assemblies to the assembly including at least one mechatronic component;

creating a second link using a second plug-in linking installed electrical components and/or entire circuits to the assembly including at least one mechatronic component;

creating a third link using a third plug-in linking programs and functions to the assembly including at least one mechatronic component;

displaying and permitting modification of a structure, status information, and features of the first authoring system, the second authoring system, and the third authoring system via the first plug-in, the second plug-in, and the third plug-in using a web application.

2. The method according to claim 1, further including the steps of:

creating a requirement profile from a multitude of individual requirements to be met by the mechatronics component to be developed;

qualifying each individual requirement based on whether it has an influence on the development of the mechanical portion, the electrical portion, the information technology portion, or multiple of these portions; and storing the requirement profile and a result of the qualification in a database and providing the requirement profile and qualification result for respective authoring systems for the development of the portions via the database.

3. The method according to claim 2, wherein a development status of the mechanical portion, the electrical portion, and/or the information technology portion and an evaluation if the respective development status meets at least one of the individual requirements can be stored in the database.

4. The method according to claim 1, wherein the separate development processes can be performed using independent authoring systems, wherein the authoring systems exchange the development information via an interface and/or a gateway among each other.

5. The method according to claim 4, wherein a warning message can be communicated between the authoring systems via the interface and/or the gateway and, if required, be stored in a memory which the authoring systems can access if the development status of one of the portions was changed via the assigned authoring system and an evaluation has found that this change requires a change of the development status of another portion to meet at least one individual requirements to be met by the mechatronic component to be developed.

6. A system for developing an assembly including at least one mechatronics component, the system comprising:

a first computer authoring system configured for developing a mechanical portion of the mechatronics component;

a second computer authoring system configured for developing an electrical portion of the mechatronics component;

a third computer authoring system configured for developing an information technology portion of the mechatronics component;

a data interface or gateway connecting the first computer authoring system, the second computer authoring system, and the third computer authorizing system;

a first link using a first plug-in linking CAD objects of parts and/or assemblies to the assembly including at least one mechatronics component;

a second link using a second plug-in linking installed electrical components and/or entire circuits to the assembly including at least one mechatronics component;

a third link using a third plug-in linking programs and functions to the assembly including at least one mechatronics component;

a computer application configured to display and permit modification of a structure, status information, and features of the first authoring system, the second authoring system, and the third authoring system via the first plug-in, the second plug-in, and the third plug-in;

wherein:

the mechanical portion, the electrical portion, and the information technology portion of the mechatronics component are developed in separate development processes;

the data interface or gateway continuously or periodically communicates development status information amongst at least two of the mechanical portion, the electrical portion, and the information technology portion;

each one of the first computer authoring system, the second computer authoring system, and the third computer authoring system outputs communicated development status information of the respective other authoring systems via the data interface or gateway, and the development process of at least one of the mechanical portion, the electrical portion and the information technology portion is/are varied based on the communicated development status information; and varying the development process of at least one of the mechanical portion, the electrical portion, and the information technology portion includes pausing the development process until a specific development status of the communicated development status information is achieved, and resuming the development process after the specific development status is achieved.

7. The method according to claim 1, which further includes communicating a requirement profile or a development instruction to the development process of at least one of the mechanical portion, the electrical portion, and the information technology portion as a function of a final or preliminary development outcome.

8. The method according to claim 1, which further includes buffering development status information in a buffer which development processes can access, wherein a relevance check is performed to determine whether a respective buffered piece of development status information requires a variation of the development processes of at least one of the mechanical portion, the electrical portion, and the information technology portion or not, and wherein only such development status information is buffered whose relevance check has found that it requires a variation of the development process.

9. An arrangement for developing an assembly, which includes at least one mechatronics component, according to the method according to claim 1, wherein the arrangement includes:
   the first computer system on which the first authoring system for developing the mechanical portion is installed,
   the second computer system on which the second authoring system for developing the electrical portion is installed, and
   the third computer system on which the third authoring system for developing the information technology portion is installed,
   the data interface and/or a gateway via which the first computer system, the second computer system, and the third computer system are interconnected and exchange the development status information about the mechanical portion, the electrical portion, and the information technology portion,
   wherein each one of the first authoring system, the second authoring system, and the third authoring system is configured to output communicated development status information of the respective other authoring systems via the data interface and/or the gateway.

10. The arrangement according to claim 9, wherein the first authoring system, the second authoring system, and the third authoring system can further be connected via the data interface and/or the gateway for accessing a PDM and/or ERP system.

* * * * *